United States Patent [19]
Krumpelt et al.

[11] Patent Number: 6,110,861
[45] Date of Patent: Aug. 29, 2000

[54] PARTIAL OXIDATION CATALYST

[75] Inventors: Michael Krumpelt, Naperville; Shabbir Ahmed, Bolingbrook; Romesh Kumar, Naperville; Rajiv Doshi, Downers Grove, all of Ill.

[73] Assignee: The University of Chicago, Chicago, Ill.

[21] Appl. No.: 08/867,556

[22] Filed: Jun. 2, 1997

[51] Int. Cl.⁷ .......................... B01J 23/40; C04B 35/48; H01M 4/86; G01N 27/26
[52] U.S. Cl. ...................... 502/326; 502/330; 502/333; 502/334; 502/339; 502/302; 502/303; 502/304; 501/103; 501/126; 501/152; 429/40; 429/41; 429/42; 429/43; 429/44; 429/45; 429/46; 204/421
[58] Field of Search ................................. 502/326, 327, 502/328, 330, 333, 334, 339–341, 354, 355, 61, 65, 73, 74; 204/421; 501/103, 152, 126; 429/40–46

[56] References Cited

U.S. PATENT DOCUMENTS

| | | | |
|---|---|---|---|
| 3,400,054 | 9/1968 | Ruka et al. | 204/1 |
| 4,088,543 | 5/1978 | Ruka | 204/1 T |
| 5,102,860 | 4/1992 | Ovshinsky et al. | 505/1 |
| 5,332,483 | 7/1994 | Gordon | 204/265 |
| 5,380,692 | 1/1995 | Nakatsuji et al. | 502/303 |
| 5,385,874 | 1/1995 | Renlund et al. | 501/103 |
| 5,441,610 | 8/1995 | Renlund et al. | 204/129 |
| 5,478,444 | 12/1995 | Liu et al. | 205/334 |
| 5,561,217 | 10/1996 | Weyer et al. | 528/410 |
| 5,580,680 | 12/1996 | Chaloner-Gill et al. | 429/192 |
| 5,597,771 | 1/1997 | Hu et al. | 502/334 |
| 5,665,482 | 9/1997 | Mori et al. | 429/33 |
| 5,698,267 | 12/1997 | Friese et al. | 427/430.1 |
| 5,698,367 | 12/1997 | Friese et al. | 427/430.1 |
| 5,709,786 | 1/1998 | Friese et al. | 204/421 |
| 5,750,458 | 5/1998 | Kennelly et al. | 502/304 |
| 5,766,317 | 6/1998 | Cable et al. | 96/10 |
| 5,766,787 | 6/1998 | Watanabe et al. | 429/33 |
| 5,785,839 | 7/1998 | Kleitz et al. | 205/634 |
| 5,929,286 | 7/1999 | Krumpelt et al. | 568/383 |

FOREIGN PATENT DOCUMENTS

| | | |
|---|---|---|
| 0333037 | 9/1989 | European Pat. Off. . |
| 0427494 | 5/1990 | European Pat. Off. . |
| 0548679 | 9/1992 | European Pat. Off. . |
| 9604200 A1 | 8/1995 | European Pat. Off. . |

*Primary Examiner*—Mark L. Bell
*Assistant Examiner*—Patricia L. Hailey
*Attorney, Agent, or Firm*—Emrich & Dithmar

[57] ABSTRACT

A two-part catalyst comprising a dehydrogenation portion and an oxide-ion conducting portion. The dehydrogenation portion is a group VIII metal and the oxide-ion conducting portion is selected from a ceramic oxide crystallizing in the fluorite or perovskite structure. There is also disclosed a method of forming a hydrogen rich gas from a source of hydrocarbon fuel in which the hydrocarbon fuel contacts a two-part catalyst comprising a dehydrogenation portion and an oxide-ion conducting portion at a temperature not less than about 400° C. for a time sufficient to generate the hydrogen rich gas while maintaining CO content less than about 5 volume percent. There is also disclosed a method of forming partially oxidized hydrocarbons from ethanes in which ethane gas contacts a two-part catalyst comprising a dehydrogenation portion and an oxide-ion conducting portion for a time and at a temperature sufficient to form an oxide.

32 Claims, 4 Drawing Sheets

PARTIAL OXIDATION CATALYST

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

Fuel cell-powered vehicles are being developed by the domestic and foreign automotive industry as a more fuel efficient and less polluting alternative to the current internal combustion engines. Since the fuel cells operate preferably on hydrogen, but storing of hydrogen on-board a vehicle is not as convenient as carrying liquid hydrocarbon fuel in a tank, a "fuel processor" must generate the hydrogen.

Converting hydrocarbon fuels to hydrogen can be done by steam reforming (reaction of the hydrocarbon with steam) or by partial oxidation (reaction with a substoichiometric amount of air). Steam reforming reactors are fairly bulky and are heat-transfer limited. Partial oxidation is more rapid but less developed. See U.S. Pat. No. 5,248,566 issued Sep. 28, 1993 to Kumar et al., the disclosure of which is incorporated by reference, for a general discussion of the use of a fuel cell in a vehicle.

It is highly desirable to provide a catalyst for the partial oxidation reaction so that the temperature, can be lowered from the 1000° C. temperatures required for steam reformers. At lower temperatures, the reactors can be smaller, and the product gas contains higher concentrations of hydrogen and less carbon monoxide, which is desirable. However, an appropriate catalyst has heretofore not been available. This invention relates to a new family of catalysts that are effective for the conversion of a wide range of hydrocarbons, including aliphatic hydrocarbons to hydrogen.

SUMMARY OF THE INVENTION

This invention relates to a partial oxidation catalyst. More specifically, this invention relates to a catalyst for partially oxidizing hydrocarbon fuels such as gasoline to produce a high percentage yield of hydrogen suitable for supplying a fuel cell. The difficulty of converting hydrocarbons (e.g. n-octane, iso-octane, etc.), a main component of gasoline, to hydrogen is the fact that the hydrogen/oxygen bond is thermodynamically stronger than the carbon oxygen bond at moderate temperatures. Under thermal equilibrium conditions, the reaction products will therefore be rich in water and poor in hydrogen. In order to produce a hydrogen-rich gas, a bifunctional catalyst is required which can "dehydrogenate" the hydrocarbon molecule, and then selectively oxidize the carbon chain.

In one aspect of the invention, the catalyst is a cermet containing ceria as the oxide ion conduction material, and platinum as the hydrogen dissolving material. The catalyst can be prepared from a high surface area powder of doped ceria ($Ce_{0.8}Gd_{0.2}O_{1.9}$) and a second phase powder which could be either a metal like platinum or an oxide like $Co_2O_3$ which is reduced in-situ in the reactor to cobalt metal. Other metals include all noble and transition metals. Other oxide ion conducting materials such as zirconia, bismuth oxides or vanadates, lanthanum gallate, perovskite containing manganese, iron, cobalt, or others forming oxygen deficient structures are applicable.

In another aspect of the invention, various alkanes can be oxidized by contact with the catalyst of the present invention to form alkene oxides, ketones or aldehydes.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

Figure 1:
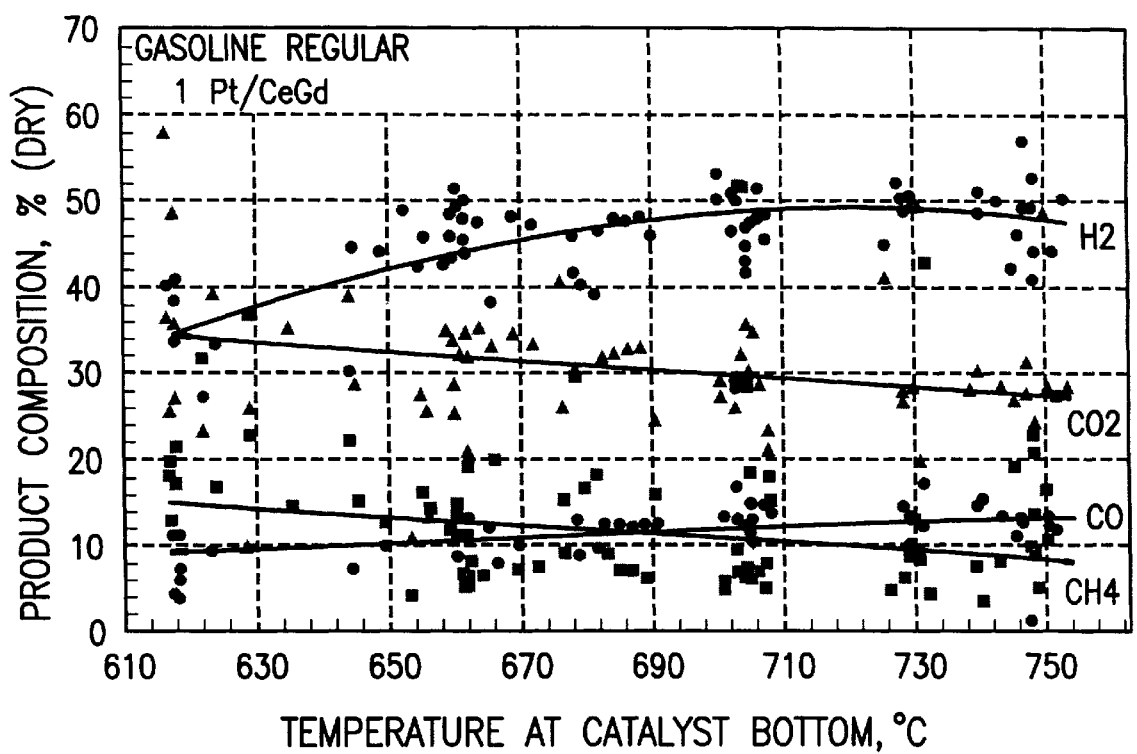
FIG. 1 is a graph depicting the relationship between temperature and product gas composition for regular gasoline and a catalyst of Pt/CeGdO.

The difficulty of converting hydrocarbons such as n-octane (the main component of gasoline) to hydrogen is the fact that the hydrogen/oxygen bond is thermodynamically stronger than the carbon oxygen bond at moderate temperatures. Under thermal equilibrium conditions, the reaction product will therefore be rich in water and poor in hydrogen. We discovered that in order to get a hydrogen-rich gas one would have to find a catalyst that can "dehydrogenate" the hydrocarbon molecule, and then selectively oxidize the carbon chain. Thus, the catalyst must be bifunctional.

To dehydrogenate a hydrocarbon molecule, one can use metals that dissolve hydrogen such as platinum, nickel or any Group VIII metal. Ni is the least preferred because an oxidation product thereof, $NiO_4$, is poisonous. To selectively oxidize the carbon chain, we found that one is able to use a source of ionic oxygen. Ionic oxygen apparently reacts with the double bonds of a dehydrogenated hydrocarbon to form oxygen carbon bonds. Sources of ionic oxygen are oxides crystallizing in the fluorite or perovskite structure, such as for instance by way of example without limitation, $ZrO_2$, $CeO_2$, $Bi_2O_3$, $BiVO_4$, $LaGaO_3$. By combining such oxides with a hydrogen dissolving metal and passing a hydrocarbon/air mixture over it, we discovered it is possible to obtain hydrogen-rich gas from an aliphatic as well as aromatic hydrocarbons.

We chose for purposes of examples, only, ceria as the oxide ion conducting material, and platinum as the hydrogen dissolving metal. A cermet containing the catalysts were prepared by a solid state method. The starting powders were a high surface area (about 32 $m^2/gm$) doped ceria ($Ce_{0.8}Gd_{0.2}O_{1.9}$) and a second phase. The starting second phase powder was either a metal like Pt or an oxide like $Co_2O_3$ which is reduced in-situ in the reactor to cobalt metal.

The two powders were mixed in the desired ratios of 1% Pt metal and 99% ceramic along with some isopropyl alcohol and up to 5 wt % of a dispersing agent for Rk the second phase (oleic acid for metals and Hypermer Kd2 from ICI Americas Inc. for oxides) and then milled vigorously in a high density polyethylene bottle with Tosoh milling media. The mixture was then dried to remove the alcohol while stirring on a hot plate to about 70° C., pressed into 1.125–1.5" pellets with about 3 gms of powder using 10,000 to 12,000 lbs. load and fired at 1000° C. for 15–60 mins. in air. The resulting pellet had a uniform pore structure to allow gas access.

Such catalysts were tested in a reactor with feed streams of a hydrocarbon fuel ($C_nH_m$), water and oxygen. The liquid fuel and liquid water were vaporized in a heated coil under a temperature bath maintained at 130–140° C. Oxygen was mixed in with the vapors and the reactant mixture was then fed into the reactor tube. The three feeds were mixed such that the (oxygen/fuel) molar ratio was less than or equal to n/2, while the water/fuel (molar) ratio was greater than or equal to n. The feed rates were adjusted to obtain a residence time of between 0.1–2 second in contact with the catalysts.

The catalysts particles were packed inside the reactor, typically weighing 1.5–2.5 g and occupying 1–3 $cm^3$ of space. The reactor tube was kept in an electrically heated furnace and maintained at the desired temperature (200–700° C.). Thermocouples located above and below the catalyst measured the temperature at the catalyst bed inlet and outlet, respectively.

Figure 2:
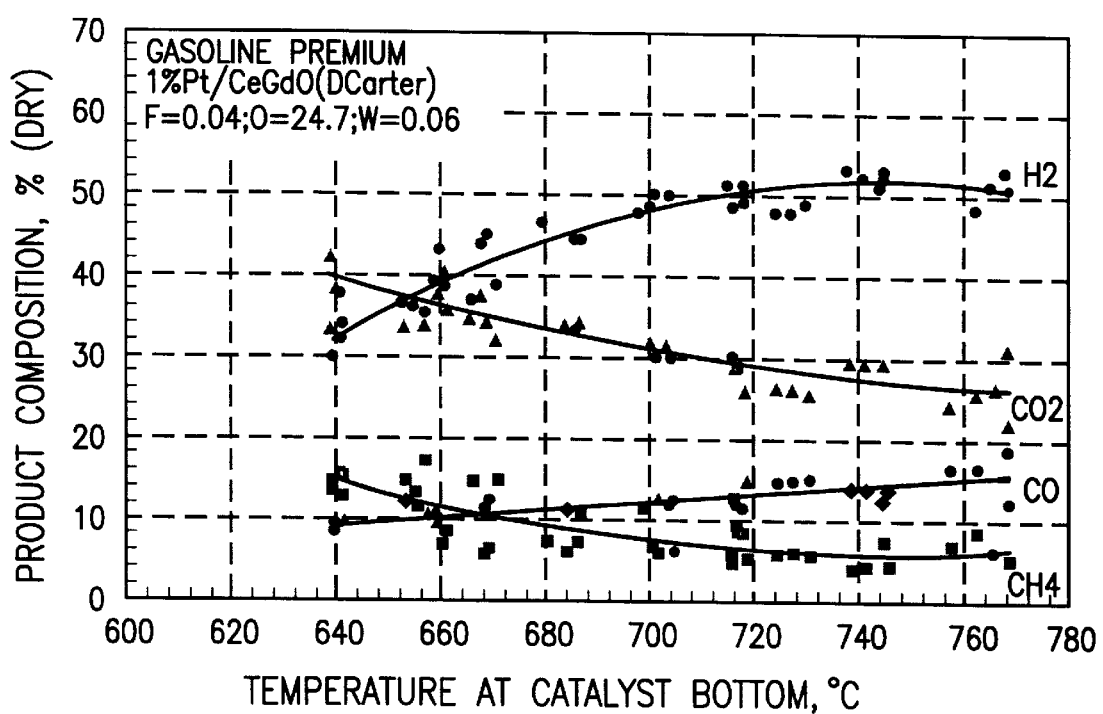
FIG. 2 is a graph depicting the relationship between temperature and product gas composition for premium gasoline and a catalyst of Pt/CeGdO.
Figure 3:
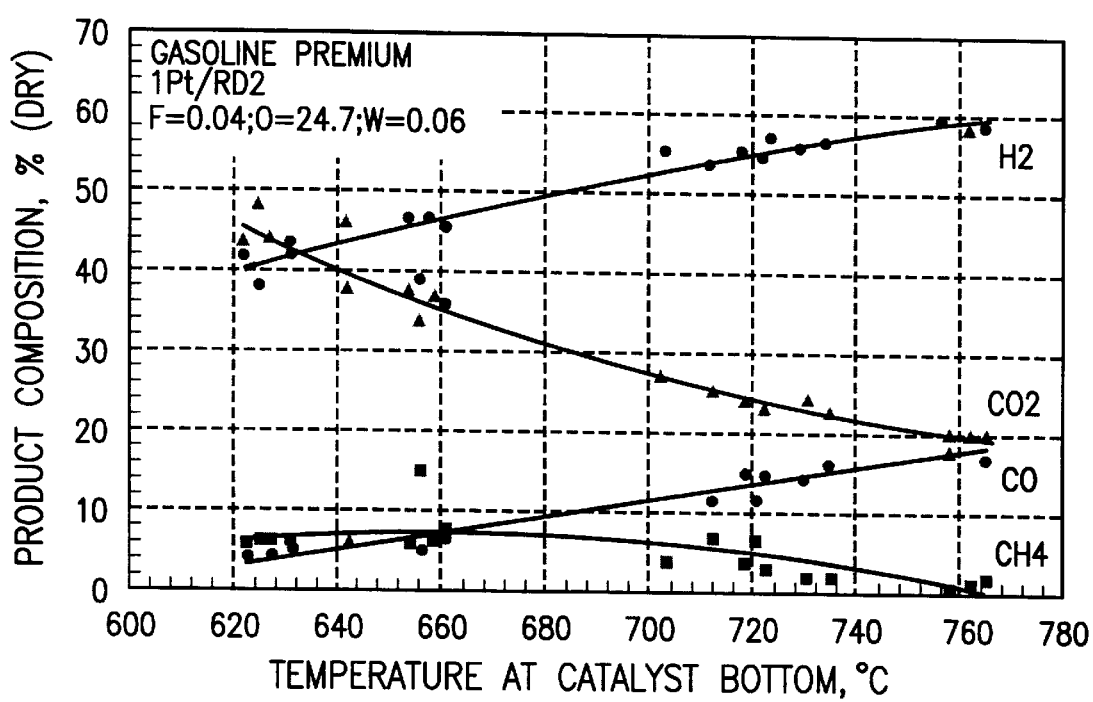
FIG. 3 is a graph depicting the relationship between temperature and product gas composition for premium gasoline and a catalyst of Pt/CeSmLiO.
Figure 4:
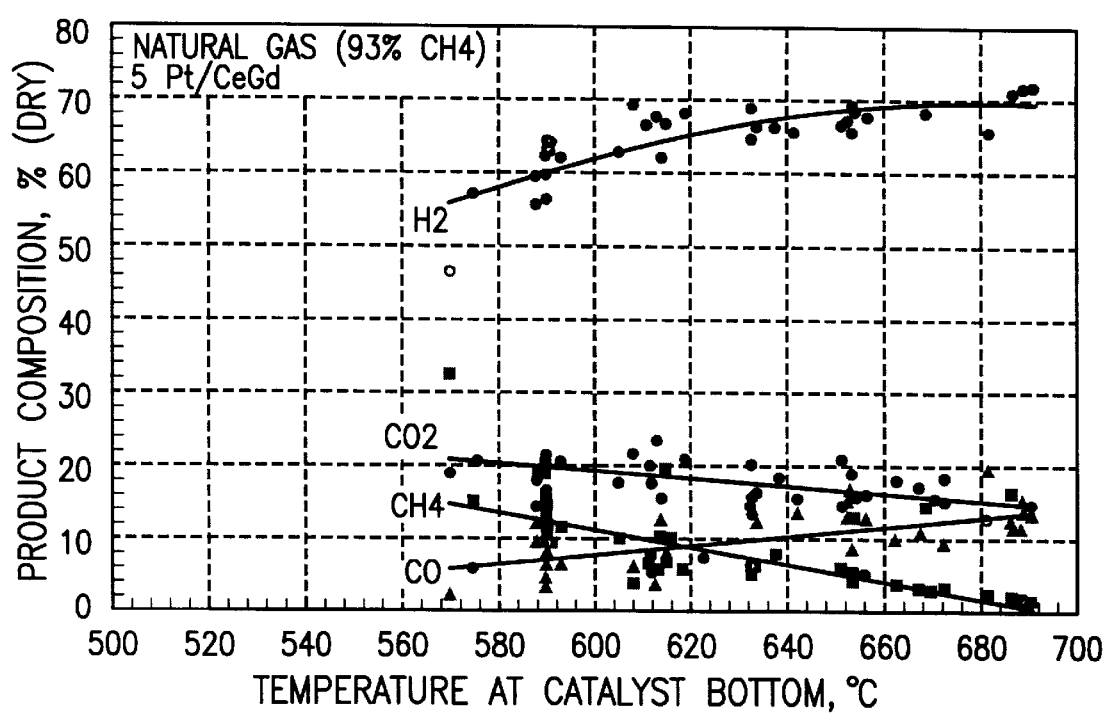
FIG. 4 is a graph depicting the relationship between temperature and product gas composition for natural gas and a catalyst of Pt/CeGdO.

Referring to FIG. 1, there is reported the results of tests using a Pt/CeGdO two part catalyst with regular gasoline. FIG. 2 shows the results of tests using a Pt/Ce GdO two part catalyst with premium gasoline. FIG. 3 shows the results of tests using a Pt/Ce Sm LiO two part catalyst with premium gasoline and FIG. 4 shows the results of Pt/CeGdO two part catalyst on natural gas.

In general, any Group VIII metal (or mixtures thereof) may be used in combination with an oxide-ion conducting ceramic crystallizing in the fluorite or perovskite structure. The oxide may be doped with a suitable rare earth, such as Gd or Sm or additionally with a suitable alkali or alkaline earth metal, such as Li or Na.

In general, the reaction, which is exothermic, should be conducted in the range of from about 400° C. to about 900° C. and preferably from about 500° C. to about 750° C. The lower the temperature while maintaining high $H_2$ concentration and low CO concentration, the better. It is important to obtain as high a concentration of hydrogen as possible, but one limiting aspect is the amount of CO found, which should preferably not exceed 5% by volume.

In another aspect of the invention, various alkanes, such as ethane, can be contacted with the inventive catalysts to form various oxides, such as ethylene oxide, ketones and aldehydes. The reaction has to be at a temperature and for a time sufficient to form the desired products, all parameters of time and temperature are within the skill of art.

While there has been disclosed what is considered to be the preferred embodiment of the present invention, it is understood that various changes in the details may be made without departing from the spirit, or sacrificing any of the advantages of the present invention.

What is claimed is:

1. A two-part catalyst comprising a powder dehydrogenation portion and a powder oxide-ion conducting portion, wherein the powder oxide-ion conducting portion is doped with a rare earth metal.

2. The catalyst of claim 1, wherein the powder dehydrogenation portion includes a group VIII powder metal other than Ni.

3. The catalyst of claim 1, wherein the powder dehydrogenation portion is selected from Pt, Pd and mixtures thereof.

4. The catalyst of claim 1, wherein the dehydrogenation portion includes the powder of a group VIII metal other than Ni.

5. The catalyst of claim 4, wherein said oxide-ion conducting portion is a ceramic oxide powder doped with a rare earth metal.

6. The catalyst of claim 1, wherein the oxide-ion conducting portion includes a ceramic oxide powder selected from the group consisting of $ZrO_2$, $CeO_2$, $Bi_2O_3$, $(BiVO)_4$, $LaGaO_3$ and mixtures thereof and a dopant selected from rare earths, the alkaline earth and alkali metals.

7. The catalyst of claim 6, wherein said two-part catalyst is effective at temperatures greater than about 400° C. to produce a hydrogen-rich gas from a hydrocarbon fuel in contact therewith wherein the CO content is not greater than about 5% by volume.

8. The catalyst of claim 6, wherein said two-part catalyst is effective at temperatures between about 500° C. and about 900° C. to produce a hydrogen-rich gas from a hydrocarbon fuel in contact therewith having a CO content not greater than about 5% by volume.

9. The catalyst of claim 6, wherein said two-part catalyst is effective at temperatures in the range of from about 500° C. to about 900° C. to produce a hydrogen-rich gas from a hydrocarbon fuel in contact therewith, said hydrocarbon fuel being selected from gasoline, natural gas, gas rich in alkanes, gas containing branched alkanes and alkanes.

10. A two-part catalyst comprising a powder dehydrogenation portion selected from group VIII metals and mixtures thereof, and a powder oxide-ion conducting portion, wherein the powder oxide-ion conducting portion is doped with a rare earth metal.

11. The catalyst of claim 10, wherein the group VIII metal is Pt, Pd or mixtures thereof.

12. The catalyst of claim 11, wherein the group VIII metal is Pt and the oxide-ion conducting portion includes $CeO_2$ powder.

13. The catalyst of claim 12, wherein the $CeO_2$ powder is doped with a rare earth metal.

14. The catalyst of claim 13, wherein the $CeO_2$ doped catalyst powder is $Ce_{0.8} Gd_{0.2} O_{1.9}$.

15. The catalyst of claim 10, wherein the powder oxide-ion conducting portion includes a ceramic.

16. The catalyst of claim 15, wherein the ceramic includes one or more of $ZrO_2$, $CeO_2$, $Bi_2O_3$, $(BiVO)_4O_3$, $LaGaO_3$ and a dopant selected from rare earths, the alkaline earth and alkali metals.

17. The catalyst of claim 10, wherein the group VIII metal is Pd powder.

18. The catalyst of claims 17, wherein the powder oxide-ion conducting portion includes a ceramic including one or more of $ZrO_2$, $CeO_2$, $Bi_2O_3$ $(V+Bi)_2O_3$ and $LaGaO_3$ and a dopant selected from the group consisting of rare earths, the alkaline earth and alkali metals.

19. A two-part catalyst comprising a powder dehydrogenation portion and a powder oxide-ion conducting portion selected from the group consisting of a powder ceramic oxide crystallizing in the fluorite structure or $LaGaO_3$, wherein the powder ceramic oxide initially has a surface area greater than 30 $m^2/gm$ and is mixed with powder dehydrogenation portion, pressed and heated to form a solid porous shape.

20. The catalyst of claim 19, wherein said powder oxide-ion conducting ceramic is one or more of $ZrO_2$, $CeO_2$, $Bi_2O_3$, $(BiVO)_4$, and $LoGaO_3$.

21. A catalyst comprising a pressed combination of powders comprising group VIII metals or mixtures thereof other than Ni and a powder ceramic oxide other than $Bi_2O_3$ that is an oxide ion conducting portion doped with a rare earth metal, or mixtures thereof.

22. The catalyst of claim 21 wherein the powder ceramic oxide includes one or more of $ZrO_2$, $CeO_2$, $(BiVO)_4O_3$, $LaGaO_3$ and a dopant selected from rare earths, the alkaline earth and alkali metals.

23. The catalyst of claim 21, wherein the powder ceramic oxide is also doped with an alkali metal or an alkaline earth metal.

24. The catalyst of claim 23, wherein the group VIII metal is Pt powder and the oxide-ion conducting portion includes $CeO_2$ powder.

25. The catalyst of claim 21, wherein the group VIII metal is Pd.

26. The catalyst of claim 25, wherein the powder oxide-ion conducting portion includes a ceramic including one or more of $ZrO_2$, $CeO_2$, $Bi_2O_3$ $(V+Bi)_2O_3$ and $LaGaO_3$.

27. A two part catalyst comprising a sintered form of a powder dehydrogenation portion and a powder oxide-ion conducting portion, wherein the dehydrogenation portion includes the powder of a group VIII metal and the oxide-ion conducting portion is a ceramic oxide powder doped with a rare earth metal.

28. The catalyst of claim 27, wherein the ceramic oxide powder is doped with Gd, Sm or mixtures thereof and an alkali or alkaline earth metal.

29. A two-part catalyst comprising sintered form of a powder dehydrogenation portion selected from Group VIII metals other than Ni and mixtures thereof, and a powder oxide-ion conducting portion including $CeO_2$ doped with a rare earth metal.

30. A catalyst comprising a pressed or sintered combination of powders of a Group VIII metal other than Ni and mixtures thereof and a powder ceramic oxide including one or more of $ZrO_2$, $CeO_2$, $Bi_2O_3$, $(BiV)_4O_3$, $LaGaO_3$ doped with a rare earth metal.

31. A catalyst comprising a pressed or sintered combination of powder of a Group VIII metal and mixtures thereof and a powder $LaGaO_3$ doped with an alkaline earth metal or mixtures thereof.

32. A two-part catalyst comprising a dehydrogenation portion and a oxide-ion conducting portion, wherein the oxide-ion conducting portion is doped with a rare earth metal.

* * * * *